US012230947B2

(12) United States Patent
Semine

(10) Patent No.: US 12,230,947 B2
(45) Date of Patent: Feb. 18, 2025

(54) CABLE FASTENING SYSTEM FOR ELECTRICAL CONNECTOR ASSEMBLY

(71) Applicant: Lear Corporation, Southfield, MI (US)

(72) Inventor: Alexandre Semine, Brno (CZ)

(73) Assignee: Lear Corporation, Southfield, MI (US)

(*) Notice: Subject to any disclaimer, the term of this patent is extended or adjusted under 35 U.S.C. 154(b) by 386 days.

(21) Appl. No.: 17/884,552

(22) Filed: Aug. 9, 2022

(65) Prior Publication Data

US 2024/0055848 A1 Feb. 15, 2024

(51) Int. Cl.
*H02G 15/00* (2006.01)
*H01R 13/502* (2006.01)
*H01R 13/533* (2006.01)

(52) U.S. Cl.
CPC ........... *H02G 15/00* (2013.01); *H01R 13/502* (2013.01); *H01R 13/533* (2013.01)

(58) Field of Classification Search
CPC .... H02G 15/00; H02G 15/007; H02G 3/0616; H01R 13/502; H01R 13/533; H01R 13/506; H01R 13/5205; H01R 13/5812; H01R 24/00
See application file for complete search history.

(56) References Cited

U.S. PATENT DOCUMENTS

| | | | |
|---|---|---|---|
| 4,793,821 A | 12/1988 | Fowler et al. | |
| 5,562,477 A | 10/1996 | Moore et al. | |
| 5,722,846 A | 3/1998 | Lazaro, Jr. | |
| 7,455,543 B2 | 11/2008 | Natter et al. | |
| 7,726,999 B2 | 6/2010 | Vanzo | |
| 7,905,741 B1 | 3/2011 | Wade et al. | |
| 9,722,363 B2 | 8/2017 | Burris et al. | |
| 2021/0066848 A1* | 3/2021 | Klinedinst | H01R 13/502 |
| 2024/0250465 A1* | 7/2024 | Hofmann | H01R 13/4365 |

FOREIGN PATENT DOCUMENTS

| | | | | |
|---|---|---|---|---|
| DE | 4200549 C1 * | 5/1993 | | H02G 3/0675 |
| EP | 2731204 B1 * | 6/2017 | | H01R 13/582 |

* cited by examiner

*Primary Examiner* — Travis S Chambers
(74) *Attorney, Agent, or Firm* — MacMillan, Sobanski & Todd, LLC

(57) ABSTRACT

An electrical connector assembly includes an electrical conductor, a cable support, a housing, and a cap. The electrical connector assembly relates to a system for fastening or otherwise supporting an electrical conductor on a housing of an electrical connector assembly that reduces the amount of mechanical vibrations transmitted from the electrical conductor to other components of the electrical system. The electrical connector assembly also minimizes the likelihood that the watertightness of a seal extending between the electrical conductor and the electrical connector assembly may be compromised as a result of such mechanical vibrations.

14 Claims, 5 Drawing Sheets

CABLE FASTENING SYSTEM FOR ELECTRICAL CONNECTOR ASSEMBLY

BACKGROUND OF THE INVENTION

This invention relates in general to electrical connector assemblies that provide mechanical and electrical connections between electrically operated devices in an electrical system. In particular, this invention relates to an improved system for fastening or otherwise supporting a cable or other electrical conductor on a housing of such an electrical connector assembly that not only reduces the amount of mechanical vibrations that can be transmitted from the electrical conductor to other components of the electrical system, but also minimizes the likelihood that the watertightness of a seal extending between the electrical conductor and the electrical connector assembly may be compromised as a result of such mechanical vibrations.

Many electrical systems are known in the art that include one or more electrically operated devices. For example, most automobiles and other vehicles are provided with a variety of electrically operated devices for the comfort and convenience of a driver or an occupant. Typically, each of these electrically operated devices is connected to a source of electrical energy (and/or other components of the electrical system) by one or more electrical conductors. In many instances, an electrical connector assembly is provided on either or both ends of each electrical conductor for facilitating the installation, service, and removal of the electrically operated devices to and from the remainder of the electrical system.

A typical electrical connector assembly includes a housing that is formed from an electrically non-conductive material. The housing of the electrical connector assembly mechanically engages and supports the end of the electrical conductor to facilitate its connection (both mechanical and electrical) with the other components of the electrical system. A watertight seal may extend be provided on the housing of the electrical connector assembly for sealingly engaging the electrical conductor. A variety of electrical connector assemblies are known in the art and have functioned satisfactorily for many years.

However, it has been found that when the electrical connector assembly is used in (or when a portion of the electrical conductor extends through) a high vibration environment, mechanical vibrations may be induced in the electrical conductor. In some instances, these vibrations may be transmitted from the electrical conductor to the other components of the electrical system, which may be undesirable for a variety of reasons. In other instances, these vibrations may cause undue wear on the watertight seal extending between the housing of the electrical connector assembly and the electrical conductor. Accordingly, it would be desirable to provide an improved structure or other system for fastening or otherwise supporting a cable or other electrical conductor on the housing of such an electrical connector assembly that not only reduces the amount of mechanical vibrations that can be transmitted from the electrical conductor to other components of the electrical system, but also minimizes the likelihood that the watertightness of a seal extending between the housing of the electrical connector assembly and the electrical conductor may be compromised as a result of such mechanical vibrations.

SUMMARY OF THE INVENTION

This invention relates to an improved structure or other system for fastening or otherwise supporting an electrical conductor on a housing of an electrical connector assembly that not only reduces the amount of mechanical vibrations that can be transmitted from the electrical conductor to other components of the electrical system, but also minimizes the likelihood that the watertightness of a seal extending between the electrical conductor and the electrical connector assembly may be compromised as a result of such mechanical vibrations. The electrical connector assembly includes an electrical conductor, a cable support, a housing, and a cap. The cable support includes a retainer arm and a cable support protrusion. The housing includes a housing recess and a housing protrusion. The cable support protrusion of the cable support matches and interacts with the housing recess on the housing to support the cable support within the housing. The cap includes a locking mechanism and a tab. The housing protrusion on the housing and the locking mechanism on the cap match and interact to selectively retain the cap on and release the cap from the housing, and the retaining arm of the cable support and the tab of the locking mechanism match and interact to selectively move the retaining arm into and out of engagement with the electrical conductor.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
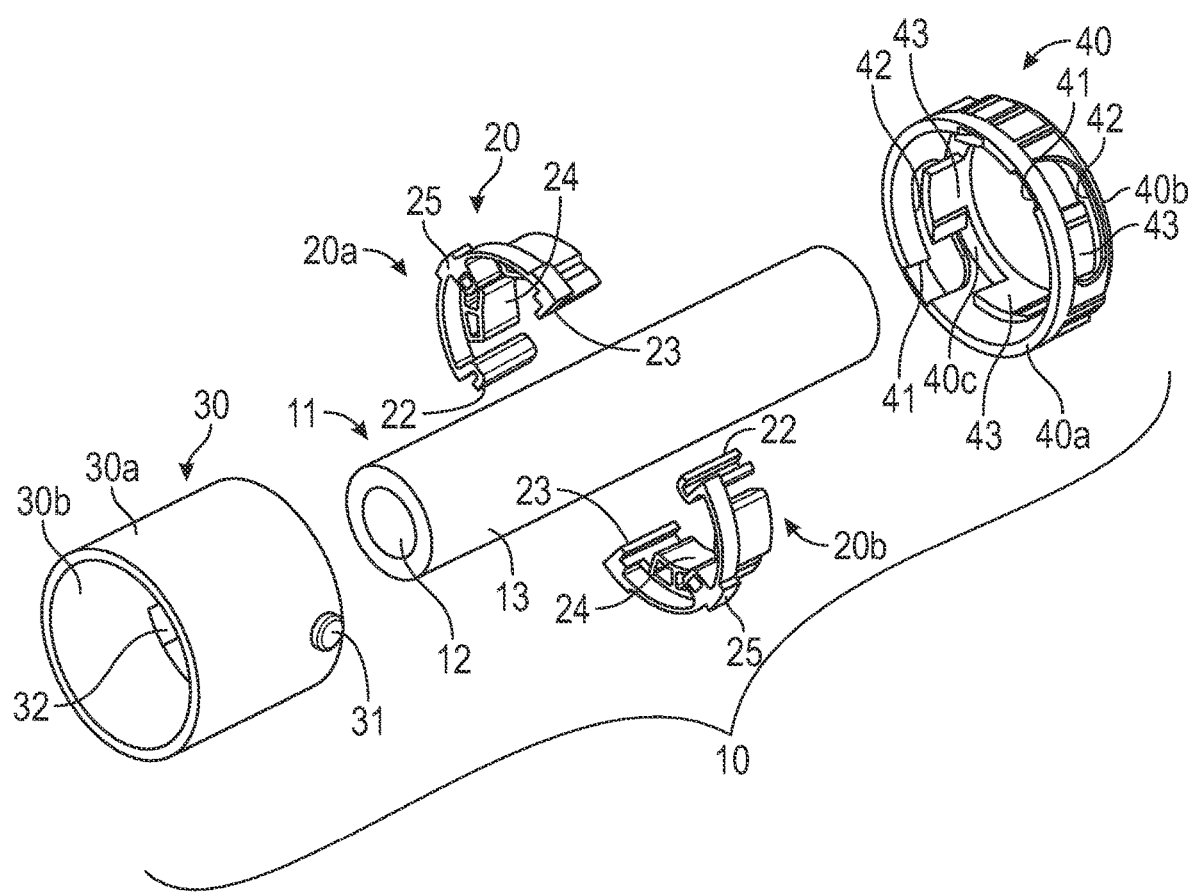
FIG. 1 is an exploded perspective view of an electrical connector assembly that includes an electrical conductor, a cable support, a housing, and a cap in accordance with this invention.

Referring now to the drawings, there is illustrated in FIGS. 1 through 9 an electrical connector assembly, indicated generally at 10, in accordance with this invention. The electrical connector assembly 10 includes an electrical conductor, indicated generally at 11, having an inner conductor portion 12 and an outer insulator portion 13. In the illustrated embodiment, the inner conductor portion 12 is generally cylindrical in shape and may terminate in an end having any desired shape, while the outer insulator portion 13 extends about all of the inner conductor portion 12 except for the end of the inner conductor portion 12. However, the illustrated electrical conductor 11 is intended to be representative of any desired electrical conductor having any desired structure or shape. Thus, the scope of this invention is not limited to the specific structure of the electrical conductor 11 described and illustrated herein.

The electrical connector assembly 10 also includes a cable support, indicated generally at 20. The illustrated cable support 20 is shown as two separate cable support components 20a and 20b that are identical in shape and are formed from an electrically non-conductive material or combination of electrically non-conductive materials. However, this invention contemplates that the cable support 20 may be formed from any desired number of separate cable support components (or from only a single cable support) as desired. Furthermore, this invention contemplates that any or all of the cable support components 20a and 20b may have differing shapes and/or be formed from any other desired material or combination of materials.

Figure 2:
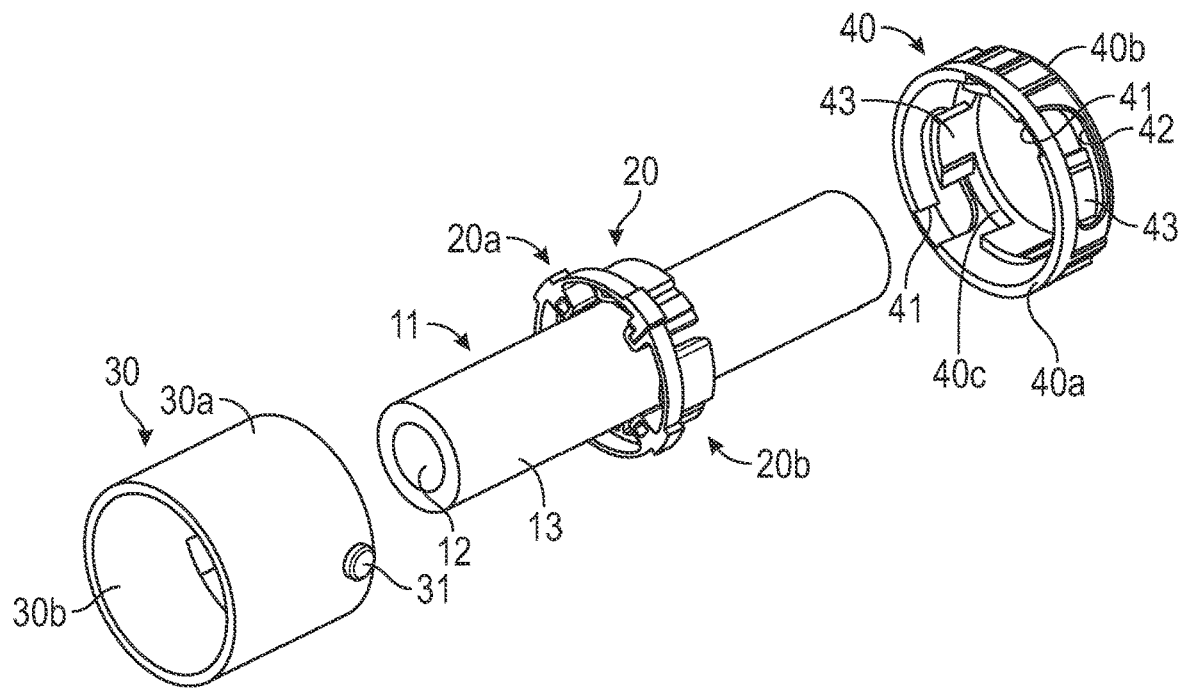
FIG. 2 is a perspective view similar to FIG. 1 showing the cable support assembled with the electrical conductor.
Figure 3:
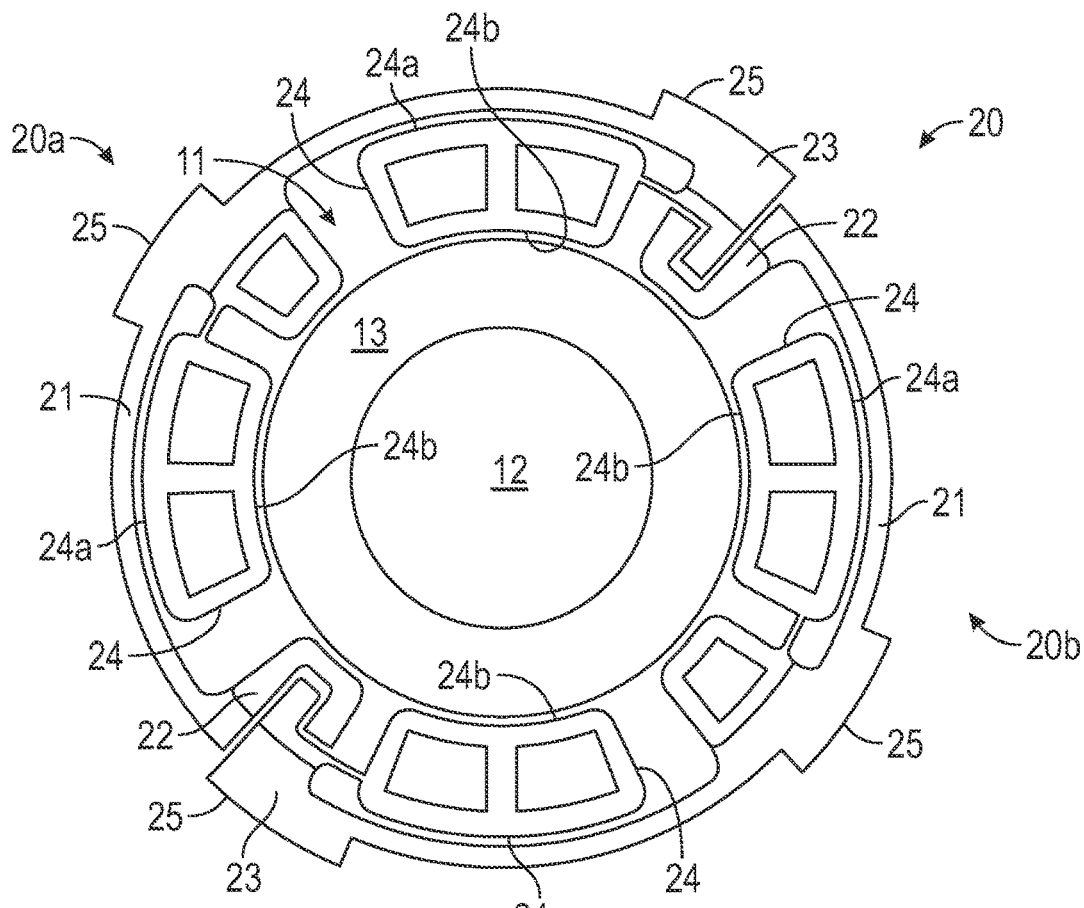
FIG. 3 is a front view of the assembly of the cable support and the electrical conductor illustrated in FIG. 2.

The structures of the cable support components 20a and 20b are illustrated in detail in FIG. 3. As shown therein, each of the illustrated cable support components 20a and 20b includes an arcuately-shaped body portion 21 that extends from a first circumferential end 22 to a second circumferential end 23. Each of the first and second circumferential ends 22 and 23 of the body portions 21 has a retaining mechanism provided thereon. As best shown in FIG. 3, the retaining mechanism provided on the first circumferential end 22 of the first cable support component 20a is structured and designed to match and interact with the complementary part of the retaining mechanism provided on the second circumferential end 23 of the second cable support component 20b. Similarly, the retaining mechanism provided on the second circumferential end 23 of the first cable support component 20a is structured and designed to match and interact with the complementary part of the retaining mechanism provided on the first circumferential end 22 of the second cable support component 20b. Thus, the first and second circumferential ends 22 and 23 of the first and second cable support components 20a and 20b match and interact with one another so as to allow the cable support 20 to be installed about the electrical conductor 11 and retained thereon, as shown in FIGS. 2 and 3.

The cable support 20 has one or more retainer arms 24 that extend between an inner circumferential surface of the body portion 21 and an outer circumferential surface of the electrical conductor 11. In the illustrated embodiment, the cable support 20 has four of such retainer arms 24 (two on each of the first and second cable support components 20a and 20b). However, the cable support 20 may have a greater or lesser number of such retainer arms 24 as desired. Each of the illustrated retainer arms 24 has an outer circumferential surface 24a and an inner circumferential surface 24b. Each of the outer circumferential surfaces 24a of the retainer arms 24 is disposed adjacent to an associated portion of the inner circumferential surface of the body portion 21 of the cable support 20. Similarly, each of the inner circumferential surfaces 24b of the retainer arms 24 is disposed adjacent to associated portion of the outer circumferential surface of the electrical connector 11. Preferably, each of the retainer arms 24 is somewhat flexible or compressible, at least the radial direction relative to the electrical conductor 11. Such flexibility or compressibility may be achieved in any known manner including, for example, the shape and/or composition of material of the retainer arms. The purpose of the retainer arms 24, and for providing them with such flexibility or compressibility, will be explained below.

Lastly, the cable support 20 includes one or more cable support protrusions 25 that extend radially outwardly from the body portion 21. In the illustrated embodiment, four of such cable support protrusions 25 extend radially outwardly from the outer circumferential surface of the body portion 21 of the cable support 20. However, the cable support 20 may have a greater or lesser number of such cable support protrusions 25 as desired. The purposes of the cable support protrusions 25 will also be explained below.

The electrical connector assembly 10 further includes a housing, indicated generally at 30. The illustrated housing 30 is generally hollow and cylindrical in shape (although such is not required) and includes an outer circumferential surface 30a and an inner circumferential surface 30b. First and second cylindrical housing protrusions 31 extend radially outwardly from the outer circumferential surface 30a of the illustrated housing 30 in opposite directions. However, a greater or lesser number of such housing protrusions 31 (having any desired shape or combination of shapes) may be provided at any desired location or locations on the housing 30. Also, one or more recesses 32 (two in the illustrated embodiment) are provided in the inner circumferential surface 30b of the illustrated housing 30. The purposes for such housing protrusions 31 and recesses 32 will be explained below.

Figure 4:
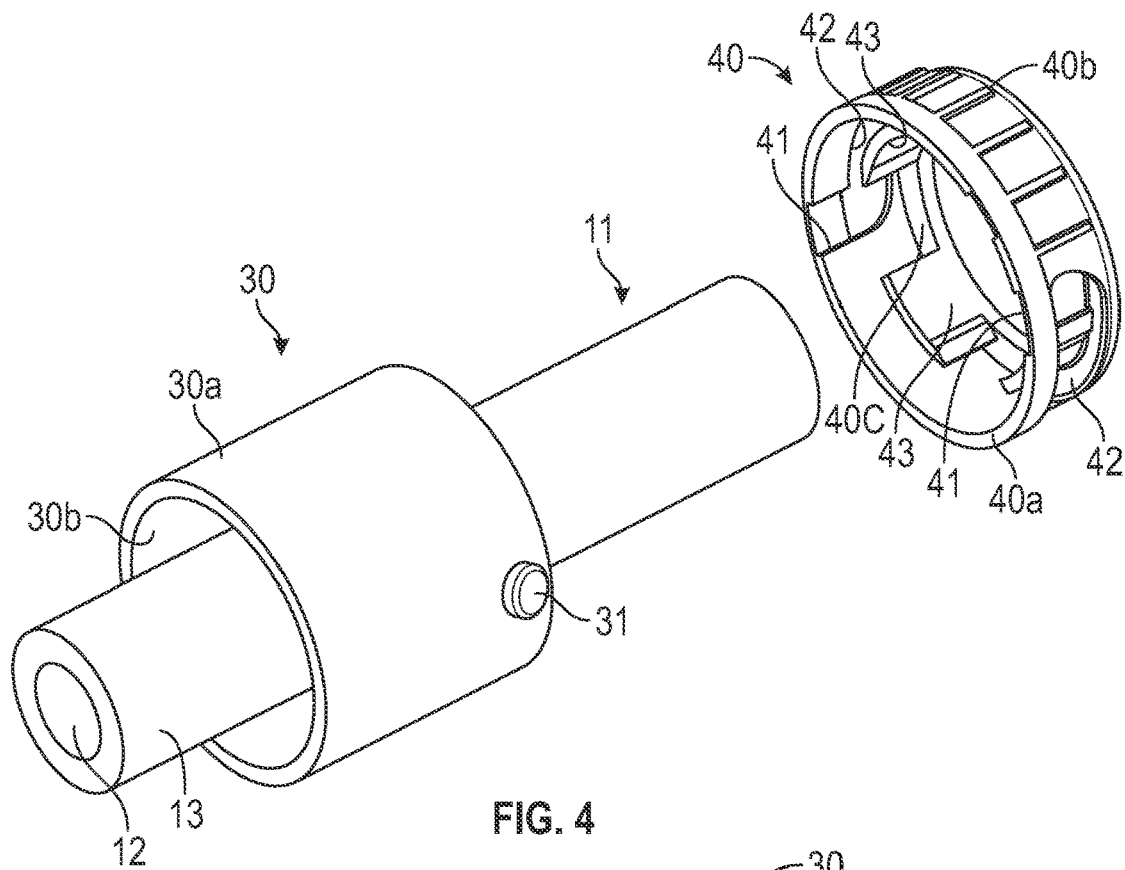
FIG. 4 is a perspective view similar to FIG. 2 showing the housing assembled with the cable support and the electrical conductor.
Figure 8:
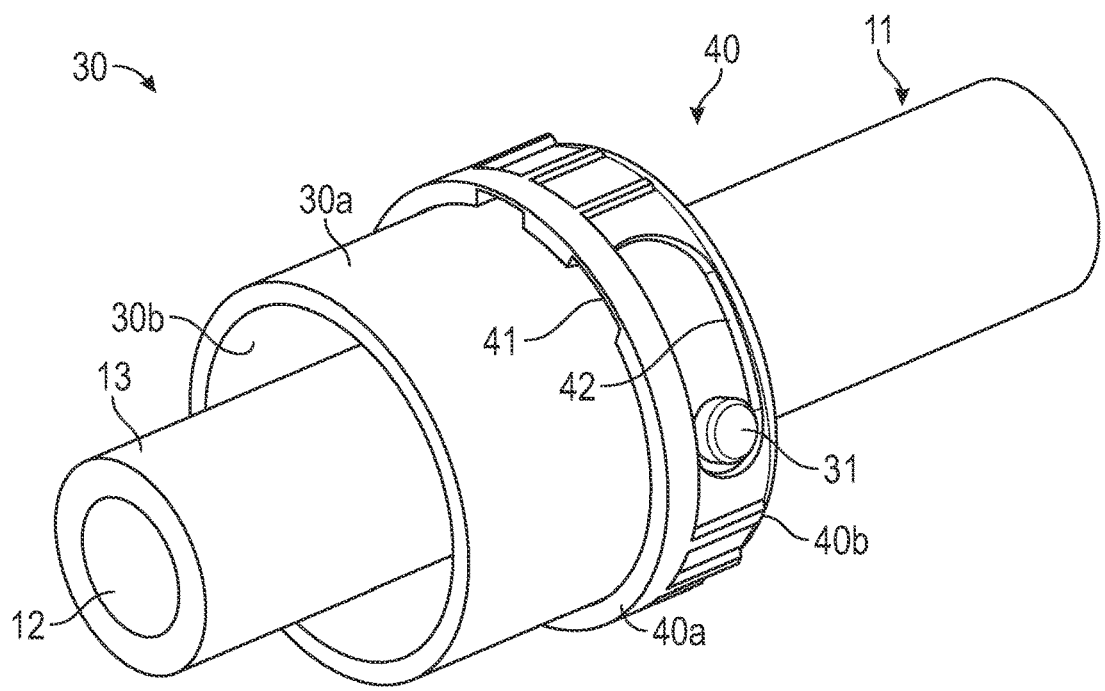
FIG. 8 is a perspective view similar to FIG. 6 showing the cap in a locked position relative to the housing.
Figure 9:
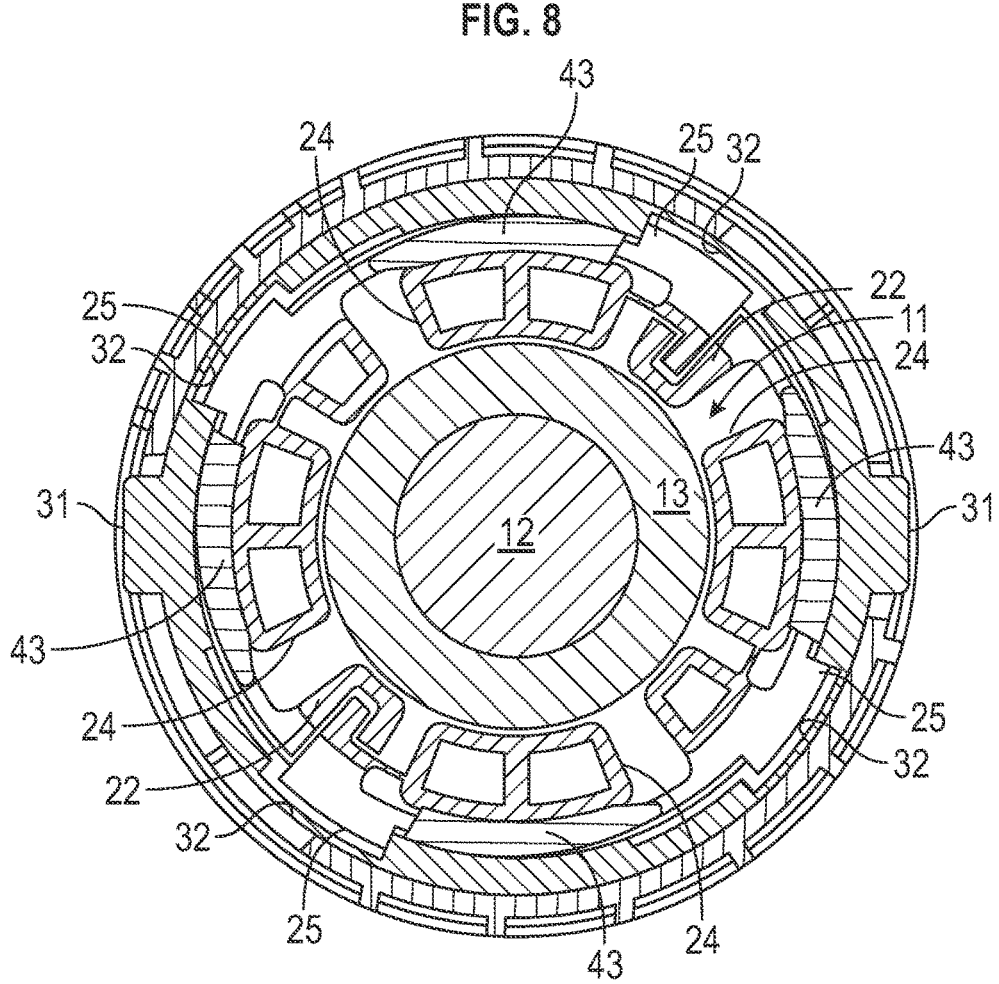
FIG. 9 is a cross-sectional view of the assembly of the cap in the locked position relative to the housing, the cable support, and the electrical conductor illustrated in FIG. 8.

Lastly, the electrical connector assembly 10 includes a cap, indicated generally at 40. The illustrated cap 40 is generally hollow and cylindrical in shape and includes outer and inner circumferential surfaces that define first and second axial ends 40a and 40b of the cap 40. The first axial end 40a of the cap 40 is opened, while the second axial end 40b of the cap is at least partially closed by a lip 40c that extends radially inwardly from the inner circumferential surface. The purpose of this lip 40c will be explained below. The cap 40 also includes a locking mechanism that is adapted to both retain the cap 40 to the assembly of the housing 30, the cable support 20, and the electrical conductor 11 and selectively move the retaining arm 24 of the cable support 20 into and out of engagement with the electrical conductor 11. The illustrated locking mechanism includes first and second recesses 41 that are provided in the inner circumferential surface 40b of the cap 40. As best shown in FIGS. 4, 8, and 9, each of the illustrated recesses 41 extends generally axially from a first recess end (located at or near the first axial end 40a of the cap 40) to a second recess end (located axially away from the first axial end 40a of the cap 40), although such is not required. Additionally, the illustrated locking mechanism 40 includes first and second slots 42 that extend through the cap 40 from the outer circumferential surface to the inner circumferential surface. As also best shown in FIGS. 4, 8, and 9, each of the illustrated slots 42 extends generally circumferentially from a first slot end (located at or near a second recess end of one of the recesses 41) to a second slot end (located circumferentially away from the associated first slot end), although again such is not required.

Thus, in the illustrated embodiment, respective pairs of the recesses 41 and the slots 42 define respective generally L-shaped passageways, the purpose of which will be explained below. Preferably, the number and general orientation of such L-shaped passageways is the same as the number and general orientation of the housing protrusions 31 extending radially outwardly from the housing 30, although again such is not required. As will be explained in detail below, the locking mechanism is structured and configured to both selectively retain the cap 40 on the housing 30 and to selectively move the retaining arms 24 of the cable support 20 into engagement with the electrical conductor 11.

Lastly, the cap 40 includes one or more tabs 43 that are provided on the axial end surface 40c thereof and extend generally axially inwardly within the cap 40. Each of the illustrated tabs 43 defines an inner surface that tapers circumferentially inwardly from a first end to a second end. The number and general orientation of the tabs 43 is preferably the same as the number and general orientation of the retainer arms 24 that extend radially inwardly from the cable support 20 toward the electrical conductor 11. Thus, in the illustrated embodiment, four tabs 43 extend generally axially inwardly from the axial end surface 40c. However, the cap 40 may have a greater or lesser number of such tabs 43 as desired. The purpose of the tabs 43 will also be explained below.

The assembly of the electrical connector assembly 10 will now be explained with reference to the drawings. Initially, the cable support 20 is assembled with the electrical conductor 11. This can be accomplished by placing the first and second cable support components 20a and 20b of the cable support 20 on opposite sides of the electrical conductor 11, as shown in FIG. 1. Then, the first and second cable support components 20a and 20b are moved inwardly toward one another until the retaining mechanisms on the first ends 22 of the first cable support components 20a mate and interact with the associated retaining mechanisms on the second ends 23 of the second cable support components 20b, as shown in FIGS. 2 and 3. As a result, an axially extending passageway is defined through the cable support 20 that receives the electrical conductor 11 and thereby allows the cable support 20 to be assembled with and retained co-axially on the electrical conductor 11.

Figure 5:
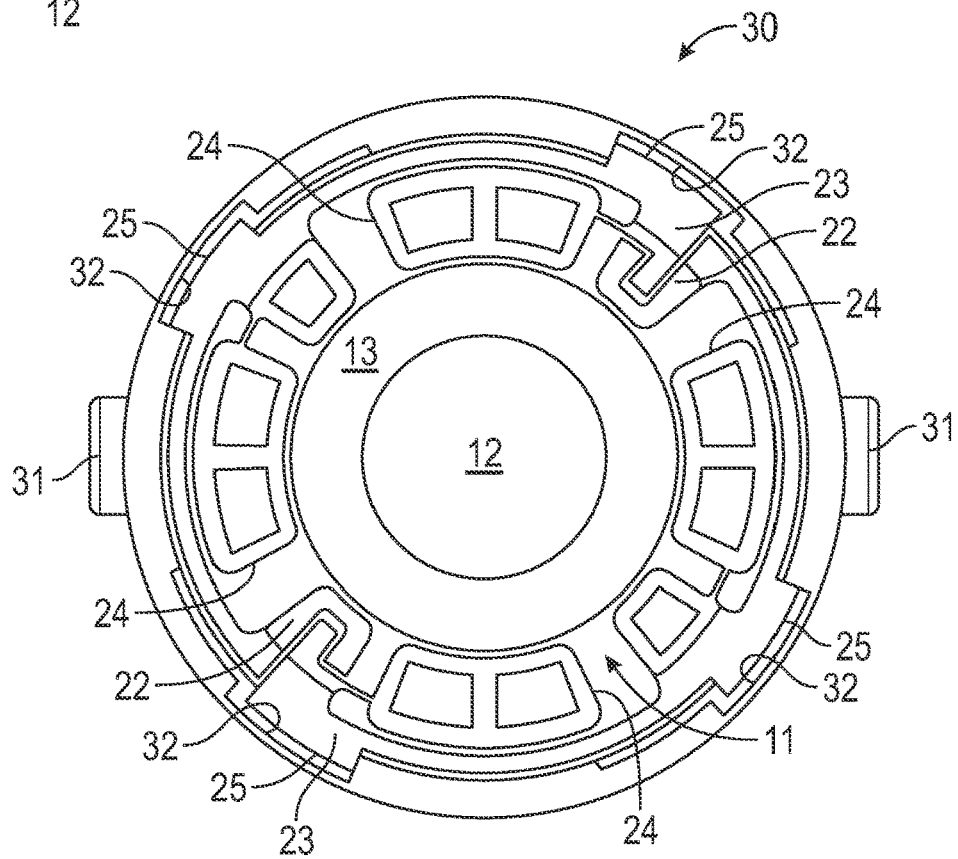
FIG. 5 is a front view of the assembly of the housing, the cable support, and the electrical conductor illustrated in FIG. 4.

Next, the housing 30 is assembled with the assembly of the cable support 20 and the electrical conductor 11. This can be accomplished by co-axially aligning the housing 30 with the assembly of the cable support 20 and the electrical conductor 11, as also shown in FIG. 2. Then, the housing 30 is moved axially toward and about the assembly of the cable support 20 and the electrical conductor 11, as shown in FIGS. 4 and 5. During such movement, the cable support protrusions 25 on the cable support 20 are axially aligned with and received within the respective recesses 32 provided in the inner circumferential surface 30b of the illustrated housing 30. As a result, the housing 30 is maintained co-axially about the assembly of the cable support 20 and the electrical conductor 11. In this assembled position, each of the inner circumferential surfaces 24b of the retainer arms 24 of the cable support 20 is disposed adjacent to associated portion of the outer circumferential surface of the electrical connector 11.

Figure 6:
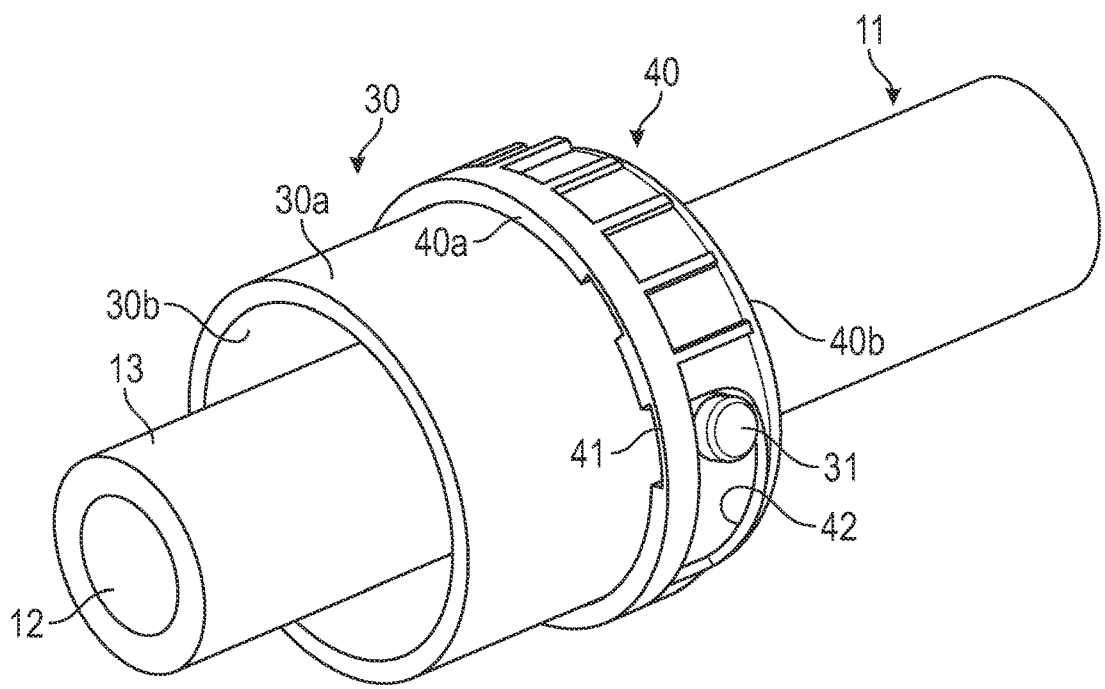
FIG. 6 is a perspective view similar to FIG. 4 showing the cap assembled with the housing, the cable support, and the electrical conductor, wherein the cap is shown in an unlocked position relative to the housing.
Figure 7:
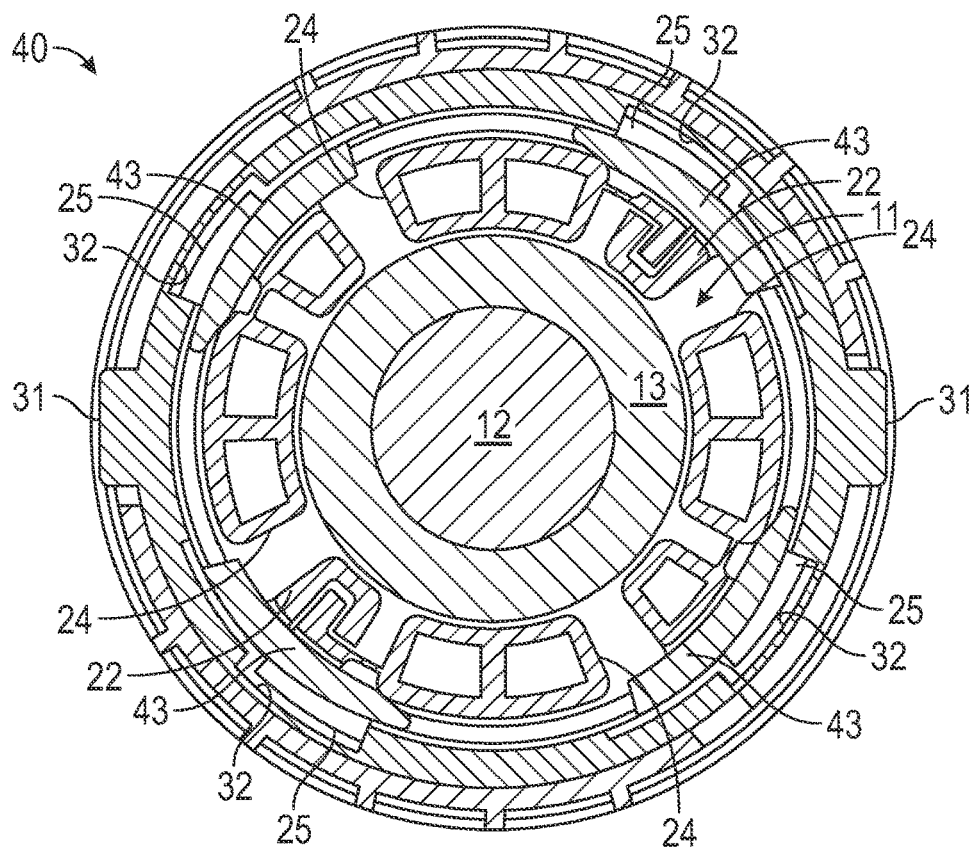
FIG. 7 is a cross-sectional view of the assembly of the cap in the unlocked position relative to the housing, the cable support, and the electrical conductor illustrated in FIG. 6.

Next, the cap 40 is assembled with the assembly of the housing 30, the cable support 20, and the electrical conductor 11. This can be accomplished by co-axially aligning the cap 40 with the assembly of the housing 30, the cable support 20, and the electrical conductor 11, as shown in FIG. 6. Then, the cap 40 is moved axially toward and about the assembly of the housing 30, the cable support 20, and the electrical conductor 11, as shown in FIGS. 6 and 7. During such movement, the housing protrusions 31 on the outer circumferential surface 30a of the housing 30 are initially axially aligned with the first recess ends of the recesses 41 in the inner circumferential surface 40b of the cap 40. Such relative co-axial movement is continued until the housing protrusions 31 contact the second recess ends of the recesses 41 as shown in FIGS. 6 and 7. In this orientation, the first (relatively radially small) ends of the tabs 43 are radially aligned with the ends of the retainer arms 24.

Thereafter, the cap 40 is rotated relative to the assembly of the housing 30, the cable support 20, and the electrical conductor 11 such that the housing protrusions 31 enter into and move circumferentially through the associated slots 42 from the first slot ends thereof until they abut the second slot ends thereof, as shown in FIGS. 8 and 9. In this orientation, the second (relatively radially large) ends of the tabs 43 are radially aligned with the ends of the retainer arms 24, as best shown in FIG. 9. Consequently, the retaining arms 24 provided on the cable support 20 are compressed between the tabs 43 of the cap 40 and the outer circumferential surface of the electrical conductor 11.

As mentioned above, each of the retainer arms 24 is somewhat flexible or compressible in the radial direction relative to the electrical conductor 11. Because of this, when the electrical connector assembly 10 of this invention is used in a high vibration environment (or at least when a portion of the electrical conductor 11 extends through such a high vibration environment), mechanical vibrations induced therein will be at least partially absorbed by the retainer arms 24 of the cable support 20. As a result, at least some of these mechanical vibrations will not be undesirably transmitted through the electrical connector assembly 10 to the other components of the electrical system. Consequently, the likelihood of the watertightness of a seal (not shown) that may be provided within the electrical connector assembly 10 being compromised as a result of such vibrations is significantly reduced.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly comprising:
   a cable support including a retainer arm and a cable support protrusion, the cable support defining a passageway that is adapted to receive an electrical conductor;
   a housing including a housing recess and a housing protrusion, wherein the cable support protrusion on the cable support interacts with the housing recess on the housing to support the cable support within the housing; and
   a cap including a locking mechanism and a tab, wherein:
   (1) the housing protrusion on the housing and the locking mechanism on the cap interact to selectively retain the cap on and release the cap from the housing, and
   (2) the retaining arm on the cable support and the tab on the locking mechanism interact to selectively move the retaining arm into and out of the passageway.

2. The assembly defined in claim 1 wherein the retainer arm is flexible or compressible.

3. The assembly defined in claim 1 wherein the cable support includes a plurality of retainer arms, and wherein the retaining arm of the cable support and the tab on the locking mechanism interact to selectively move each of the plurality of retaining arms into and out of engagement with the electrical conductor.

4. The assembly defined in claim 3 wherein each of the retainer arms is flexible or compressible.

5. The assembly defined in claim 3 wherein the cap includes a plurality of tabs, and wherein the plurality of retaining arms on the cable support and the plurality of tabs on the locking mechanism interact to selectively move the plurality of retaining arms into and out of engagement with the electrical conductor.

6. The assembly defined in claim 1 wherein:
   the cable support includes a plurality of retainer arms, and wherein the retaining arm of the cable support and the tab on the locking mechanism interact to selectively move each of the plurality of retaining arms into and out of engagement with the electrical conductor, and
   the cap includes a plurality of tabs, and wherein the plurality of retaining arms on the cable support and the plurality of tabs on the locking mechanism interact to selectively move the plurality of retaining arms into and out of engagement with the electrical conductor.

7. The assembly defined in claim 1 wherein each of the retainer arms is flexible or compressible.

8. An electrical connector assembly comprising:
   an electrical conductor;
   a cable support including a retainer arm and a cable support protrusion;
   a housing including a housing recess and a housing protrusion, wherein the cable support protrusion on the cable support interacts with the housing recess on the housing to support the cable support within the housing; and
   a cap including a locking mechanism and a tab, wherein:
      (1) the housing protrusion on the housing and the locking mechanism on the cap interact to selectively retain the cap on and release the cap from the housing, and
      (2) the retaining arm on the cable support and the tab on the locking mechanism interact to selectively move the retaining arm into and out of engagement with the electrical conductor.

9. The electrical connector assembly defined in claim 8 wherein the retainer arm is flexible or compressible.

10. The electrical connector assembly defined in claim 8 wherein the cable support includes a plurality of retainer arms, and wherein the retaining arm of the cable support and the tab on the locking mechanism interact to selectively move each of the plurality of retaining arms into and out of engagement with the electrical conductor.

11. The electrical connector assembly defined in claim 10 wherein each of the retainer arms is flexible or compressible.

12. The electrical connector assembly defined in claim 10 wherein the cap includes a plurality of tabs, and wherein the plurality of retaining arms on the cable support and the plurality of tabs on the locking mechanism interact to selectively move the plurality of retaining arms into and out of engagement with the electrical conductor.

13. The electrical connector assembly defined in claim 8 wherein:
   the cable support includes a plurality of retainer arms, and wherein the retaining arm of the cable support and the tab on the locking mechanism interact to selectively move each of the plurality of retaining arms into and out of engagement with the electrical conductor, and
   the cap includes a plurality of tabs, and wherein the plurality of retaining arms on the cable support and the plurality of tabs on the locking mechanism interact to selectively move the plurality of retaining arms into and out of engagement with the electrical conductor.

14. The electrical connector assembly defined in claim 8 wherein each of the retainer arms is flexible or compressible.

* * * * *